(12) United States Patent
Amblard et al.

(10) Patent No.: US 11,090,623 B2
(45) Date of Patent: Aug. 17, 2021

(54) THREE-PHASE REACTOR WITH RECYCLE CUP OF DECREASING SECTION AND OF VARIABLE ANGLE OF INCLINATION

(71) Applicant: IFP Energies nouvelles, Rueil-Malmaison (FR)

(72) Inventors: Benjamin Amblard, Rueil-Malmaison (FR); Joao Marques, Rueil-Malmaison (FR); Jean-Francois Le Coz, Rueil-Malmaison (FR); Yann Le Vot, Rueil-Malmaison (FR); Jean-Philippe Toupance, Rueil-Malmaison (FR); Benjamin Rodier, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 16/845,977

(22) Filed: Apr. 10, 2020

(65) Prior Publication Data

US 2020/0324261 A1 Oct. 15, 2020

(30) Foreign Application Priority Data

Apr. 12, 2019 (FR) .................................... 19/03.945

(51) Int. Cl.
*B01J 8/00* (2006.01)
*B01J 8/22* (2006.01)
*B01J 8/08* (2006.01)

(52) U.S. Cl.
CPC ............. *B01J 8/002* (2013.01); *B01J 8/0025* (2013.01); *B01J 8/082* (2013.01); *B01J 8/22* (2013.01)

(58) Field of Classification Search
CPC ..... B01J 8/20; B01J 8/22; B01J 8/1809; B01J 8/1872; B01J 8/008; B01J 8/082; B01J 2208/0991
See application file for complete search history.

(56) References Cited

U.S. PATENT DOCUMENTS

| 4,971,678 A | 11/1990 | Strickland |
| 5,219,532 A | 6/1993 | Buttke et al. |
| 2019/0321753 A1 | 10/2019 | Amblard et al. |

FOREIGN PATENT DOCUMENTS

| CN | 107790073 A | 3/2018 |
| FR | 3058421 A1 | 5/2018 |

OTHER PUBLICATIONS

Search Report in corresponding FR1903945 dated Dec. 17, 2019 (pp. 1-66).

*Primary Examiner* — Lessanework Seifu
(74) *Attorney, Agent, or Firm* — Millen White Zelano & Branigan, PC; Brion P. Heaney

(57) ABSTRACT

The present invention relates to a three-phase reactor for the reaction of a hydrocarbon feedstock with hydrogen and to a hydroconversion process, for example of H-Oil™ type, employing it, comprising a chamber with an upper end and a gas/liquid separation device comprising:

a recycle cup, above the catalytic reaction zone and delimiting, with the upper end, a recycle zone, comprising a cylindrical upper part extended by a lower part of decreasing section and of variable angle of inclination, provided with vertical pipes for the passage of a gas/liquid mixture originating from a catalytic reaction zone, and having a fixed angle of inclination β of between 50° and 85° with respect to the axis of the cylindrical part, (Continued)

a pipe for recycle of the liquid at the apex of the lower part, in fluidic communication with the lower end of the chamber by recirculation means.

20 Claims, 5 Drawing Sheets

THREE-PHASE REACTOR WITH RECYCLE CUP OF DECREASING SECTION AND OF VARIABLE ANGLE OF INCLINATION

TECHNICAL FIELD

The present invention relates to a three-phase reactor for the reaction of a hydrocarbon feedstock with hydrogen, more particularly the hydroconversion of heavy liquid hydrocarbon feedstocks, such as carried out in the H-OIL™ process. The invention especially relates to such a reactor comprising a recycle cup and to an optimized scaling of the zone for recycle of the liquid, for the purpose of improving the hydroconversion performance qualities and in particular of improving the stability of the liquid effluents produced.

This recycle cup delimits a zone in the top part of the reactor which is a zone for recycle of the liquid. A gas/liquid separation is carried out in this zone by means of the recycle cup, which makes possible, in combination with a recycle pipe, the reintroduction of the majority of the gas-free liquid to the reaction zone of the reactor and the discharge of the gas, with a minority of liquid, from the reactor.

PRIOR ART

Three-phase reactors for the reaction of a hydrocarbon feedstock, especially of a liquid feedstock, with hydrogen employing an ebullating bed catalyst and incorporating a gas/liquid separation system at the reactor top making possible recycle of the liquid at the bottom of the reactor in order to keep the ebullating bed operating are known.

For example, the patent U.S. Pat. No. 4,886,644 discloses a typical three-phase reactor which can be used in a process for the hydroconversion of a heavy hydrocarbon feedstock of H-OIL™ type, comprising a gas/liquid separation device for separating the gas from the liquid of a mixture originating from the catalytic reaction zone of the reactor. The reactor diagram of FIG. 1 is extracted from this patent. Its configuration and its functioning are described below in connection with the invention.

The recycle zone 39 is a zone devoid of catalyst, operating at a high temperature, generally of between 300° C. and 550° C., in which undesirable thermal cracking reactions of the hydrocarbons can take place, which can result in unstable or insoluble molecules promoting the formation of sediments. These entities then form solid particles, which are very viscous and/or sticky, composed of asphaltenes and coke. The excessive presence of these products results in the coking and in the deactivation of the catalyst in the reactor, and in the fouling of the reactor and generally of the process equipment and in particular of the separation and distillation equipment.

The invention differs from the reactor according to the patent U.S. Pat. No. 4,886,644 in the geometry of the recycle cup and the scaling of the top part of the reactor, making it possible in particular to increase the stability of the liquid effluents produced during the hydroconversion while continuing to provide good gas/liquid separation at the top of the reactor for a liquid recycle, devoid as much as possible of gas, at the bottom of the reactor, bound for the catalytic reaction zone.

OBJECTIVES AND SUMMARY OF THE INVENTION

The present invention is targeted generally at providing a gas/liquid separation device installed in three-phase reactors, such as those used in processes for the hydroconversion of heavy hydrocarbon fractions of H-OIL™ type, which conventionally has the role of the reintroduction of the majority of the gas-free liquid to the reaction zone and the discharge of the gas and of the remainder of the liquid from the reactor, making it possible to improve the performance qualities of the hydroconversion process, in particular to reduce the formation of sediments, and thus to increase the stability of the liquid effluents for the purpose of a better operability of the process.

Thus, in order to achieve at least one of the objectives targeted above, among others, the present invention provides, according to a first aspect, a three-phase reactor for the reaction of a hydrocarbon feedstock with hydrogen, comprising:

a vertically positioned elongated chamber comprising upper and lower ends and a side wall, said chamber comprising a catalytic reaction zone adjacent to the lower end and suitable for the reaction of the hydrocarbon feedstock and of a gas in the presence of an ebullating bed catalyst, and a zone for recycle of a liquid adjacent to the upper end, a gas/liquid separation device configured in order to separate a gas phase and a liquid phase of a mixture originating from said catalytic reaction zone, and comprising at least:

a recycle cup comprising a cylindrical upper part extended by a lower part which is provided with vertical pipes for the passage of said mixture through the recycle cup, said lower part having a decreasing section and a variable angle of inclination $\beta$ with respect to the axis of revolution (Z) of said cylindrical upper part, said recycle cup being positioned above the catalytic reaction zone and delimiting, with at least the upper end of the chamber, the recycle zone, a pipe for recycle of the liquid located at the apex of said lower part and in fluidic communication with the lower end of the chamber by recirculation means.

According to one embodiment, the lower part having a decreasing section and of variable angle of inclination comprises a dished portion, preferably of elliptical section.

According to one embodiment, the lower part having a decreasing section and of variable angle of inclination is a dished portion with a height $L_2$ having an $L_2/L_1$ ratio of between 0.01 and 0.7, preferably of between 0.02 and 0.6 and more preferentially of between 0.1 and 0.5, $L_1$ being the diameter of the cylindrical upper part of the recycle cup.

According to one embodiment, the lower part having a decreasing section and of variable angle of inclination additionally comprises at least one frustoconical portion, preferably surmounted by said dished portion.

According to one embodiment, the dished portion of the lower part having a decreasing section and of variable angle of inclination has an $L_{2b}/L_{1b}$ ratio of between 0.01 and 0.7, preferably of between 0.02 and 0.6 and more preferentially of between 0.1 and 0.5, $L_{2b}$ being the height of the dished portion and $L_{1b}$ being the greatest diameter of said lower part having a decreasing section and of variable angle of inclination.

According to one embodiment, the lower part having a decreasing section and of variable angle of inclination comprises a succession of frustoconical portions, each one of said frustoconical portions preferably having an increasing angle of inclination $\beta$ in the direction of the recycle pipe.

According to one embodiment, the lower part having a decreasing section and of variable angle of inclination comprises an inverted elliptical restriction between the cylindrical upper part and the recycle pipe, the $L_2/L_3$ ratio of the elliptical restriction preferably being of between 0.01 and 0.7, preferably of between 0.02 and 0.6 and more preferentially of between 0.1 and 0.5, $L_2$ being the vertical distance between the bottom of the cylindrical upper part and the upper part of the pipe and $L_3$ being the horizontal distance between the cylindrical upper part and the external wall of the pipe.

According to one embodiment, the recycle pipe is positioned at the center of the recycle cup, said recycle cup preferably being centered in the reactor.

According to one embodiment, the upper end of the chamber has a convex shape and has an $L_5/D_1$ ratio of between 0.01 and 20, preferably of between 0.02 and 10 and more preferentially of between 0.1 and 5, $L_5$ being the height of the upper end of the chamber and $D_1$ being the diameter of the chamber of the reactor in the recycle zone.

According to one embodiment, the cylindrical upper part of the recycle cup is formed by the side wall of the chamber.

According to one embodiment, an annular space is formed between the cylindrical upper part of the recycle cup and the side wall of the chamber.

According to one embodiment, the annular space has a width of between 0.01 and $D_1/3$ m.

According to one embodiment, the height $L_6$ of the cylindrical upper part is of between $0.01 \times D_1$ and $2 \times D_1$.

According to one embodiment, the distance $L_7$ between the vertex of the cylindrical upper part of the recycle cup and the bottom of the upper end of the chamber is of between $0.001 \times D_1$ and $2 \times D_1$.

According to one embodiment, the diameter D2 of the recycle pipe is of between 0.1 m and 3 m.

According to one embodiment, the diameter $D_1$ of the chamber of the reactor is of between 0.1 and 30 m, preferably between 0.5 m and 20 m and very preferably between 1 m and 10 m.

According to a second aspect, the present invention provides a process for the hydroconversion of a hydrocarbon feedstock comprising a reactor according to the invention.

According to one embodiment, the process is a process for the hydroconversion of a liquid hydrocarbon feedstock, in which:
hydrogen and the liquid hydrocarbon feedstock are introduced into the lower end of the chamber of the reactor according to an upward stream sufficient to produce a random movement of a catalyst in the form of particles in the catalytic reaction zone;
the catalyst is maintained as an ebullating bed in the catalytic reaction zone with an expansion in volume of between 10% and 100%, with respect to the static volume of said catalyst, by the injection of recycled liquid, preferably by means of a pump, resulting from the recycle zone adjacent to the upper end of the chamber via the recycle pipe, in order to carry out the hydroconversion reactions of said hydrocarbon feedstock;
a gas phase is separated from a liquid phase of a mixture originating from the catalytic reaction zone and sent into the pipes of the recycle cup, a part of the liquid thus separated constituting the recycled liquid sent into the lower end of the chamber of the reactor; and
the gas and the other part of the separated liquid present in the recycle zone are discharged from the reactor.

The operating conditions of the reactor can be as follows:
an absolute pressure of between 2 and 35 MPa, preferably between 5 and 25 MPa and more preferably between 6 and 20 MPa, and a temperature of between 300° C. and 550° C., preferably of between 350° C. and 500° C., more preferentially of between 370° C. and 460° C. and more preferentially still lying between 380° C. and 440° C.

Preferably, the feedstock is a heavy liquid hydrocarbon feedstock comprising a fraction of at least 50% by weight having a boiling point of at least 300° C., and containing sulfur, Conradson carbon, metals and nitrogen.

According to one embodiment, the process is a process for the hydroconversion of a solid hydrocarbon feedstock, preferably coal, in which:
hydrogen and a mixture of the solid hydrocarbon feedstock and of a liquid hydrocarbon feedstock are introduced into the lower end of the chamber of the reactor according to an upward stream sufficient to produce a random movement of a catalyst in the form of particles in the catalytic reaction zone;
the catalyst is maintained as an ebullating bed in the catalytic reaction zone with an expansion in volume of between 10% and 100%, with respect to the static volume of said catalyst, by the injection of recycled liquid, preferably by means of a pump, resulting from the recycle zone adjacent to the upper end of the chamber via the recycle pipe, in order to carry out the hydroconversion reactions of the solid hydrocarbon feedstock;
a gas phase is separated from a liquid phase of a mixture originating from the catalytic reaction zone and sent into the pipes of the recycle cup, a part of the liquid thus separated constituting the recycled liquid sent into the lower end of the chamber of the reactor; and
at least the gas and the other part of the separated liquid present in the recycle zone are discharged from the reactor.

Other subject matters and advantages of the invention will become apparent on reading the description which follows of specific exemplary embodiments of the invention, given by way of nonlimiting examples, the description being made with reference to the appended figures described below.

In the figures, the same references denote identical or analogous elements.

DESCRIPTION OF THE EMBODIMENTS

The object of the invention is to provide a three-phase reactor for the reaction of a hydrocarbon feedstock with hydrogen and a process for the hydroconversion of such a heavy hydrocarbon feedstock employing such a reactor for the purpose of obtaining, generally, stable lighter hydrocarbon products devoid of their impurities (sulfur, metals, asphaltenes, and the like). Preferably, the hydrocarbon feedstock is a liquid hydrocarbon feedstock and more preferentially a heavy liquid hydrocarbon feedstock.

Figure 1:
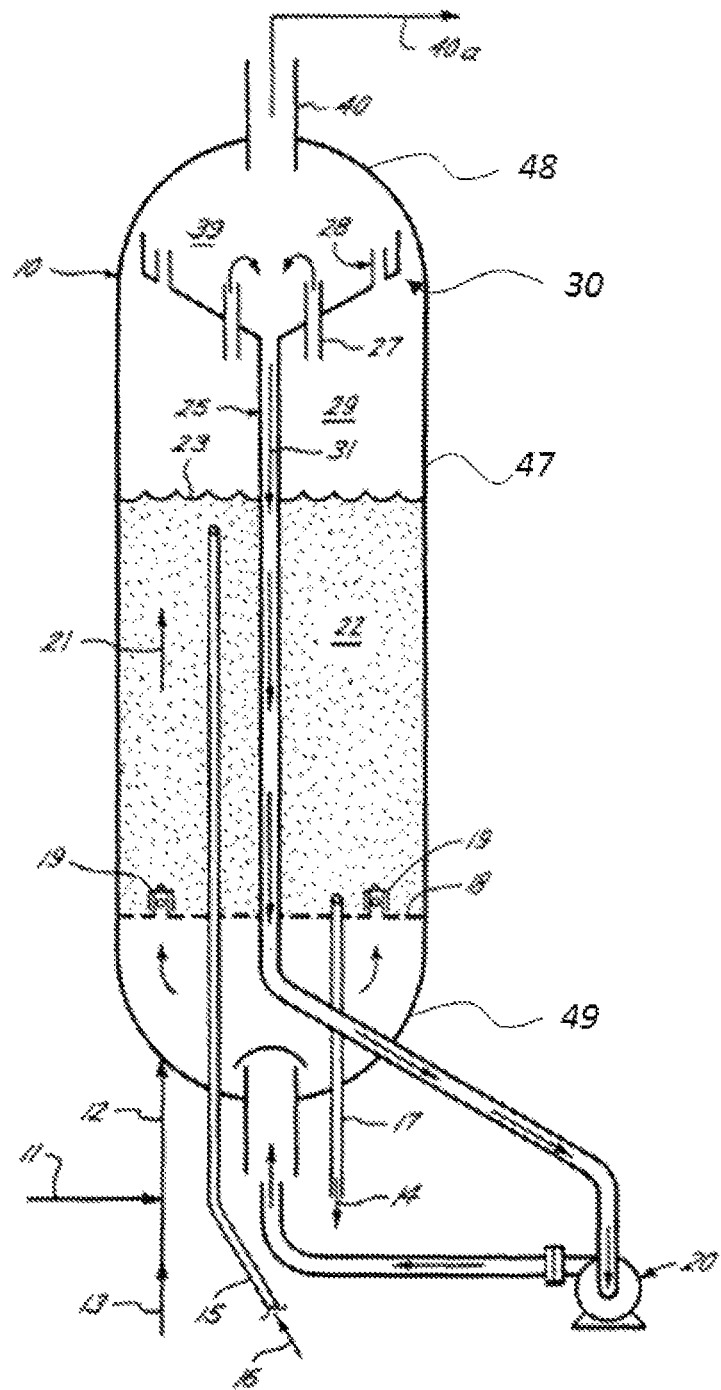
FIG. 1 is a representative diagram, in cross section, of a reactor according to the invention.

FIG. 1 is a representative diagram showing the main elements of a reactor according to the invention. The structure and the functioning of a three-phase reactor operating as an ebullating bed, as represented, and for example used in H-Oil™ processes, are known. The reactor according to the invention differs from the known reactors by the installation of a specific recycle cup in the recycle zone described in more detail in connection with FIGS. 2 to 5.

According to the invention, the reactor comprises a vertically positioned elongated chamber 10 comprising upper 48 and lower 49 ends and a side wall 47, said chamber comprising a catalytic reaction zone 22 adjacent to the lower end 49 and suitable for the reaction of the liquid hydrocarbon feedstock and of a gas in the presence of an ebullating bed catalyst (supported catalyst), and a zone for recycle of the liquid 39 adjacent to the upper end 48. The chamber the reactor is preferably cylindrical.

The reactor also comprises a gas/liquid separation device configured in order to separate a gas phase and a liquid phase of a mixture originating from the catalytic reaction zone 22. This gas/liquid separation device comprises at least:
- a recycle cup 30 comprising a cylindrical upper part 42 extended by a lower part (43a, 43b, 43c, 43d) which is provided with vertical pipes 27 for the passage of said mixture through the recycle cup, said lower part having a decreasing section and a variable angle of inclination β with respect to the axis of revolution (Z) of said cylindrical upper part 42, said recycle cup 30 being positioned above the catalytic reaction zone 22 and delimiting, with at least the upper end 48 of the chamber, the recycle zone 39,
- a pipe 25 for recycle of the liquid located at the apex of said lower part and in fluidic communication with the lower end 49 of the chamber by recirculation means.

In the present description, cylinder is understood to mean a cylinder of revolution.

Decreasing section of said lower part (43a, 43b, 43c, 43d) is understood to mean a transverse section, that is to say a section orthogonal with respect to the Z axis (axis of revolution) of the cylindrical upper part 42 (which is coincident with the vertical z), which decreases in the (downward) direction of flow of the hydrocarbon liquid, that is to say in the direction of the recycle pipe 25.

Variable angle of inclination β is understood to mean that the angle β is not constant over the entire height of the lower part, which excludes in particular a conical or frustoconical lower part (formed by a cone alone). The angle of inclination β, illustrated in FIGS. 2 to 5 and described later, is the angle formed between the tangent at a point of the lower part and an axis parallel to the Z axis passing through this point.

This lower part can be a dished part, known by a person skilled in the art as "dished end", such as, for example, described in the standardizing documents NF E 81-100, NF E 81-101 (dished ends with small knuckle radius SKR—dishing radius greater than or equal to the external diameter of the end and a knuckle radius of between 30 et 500 mm, depending on the diameters), NF E 81-102 (dished ends with large knuckle radius LKR—dishing radius equal to the external diameter of the end and a knuckle radius equal to one tenth of this same diameter), NF E 81-103 (elliptical dished ends), NF E 81-104 (dished ends with medium knuckle radius MKR—dishing radius equal to the external diameter of the end and a knuckle radius of between one thirtieth and one fiftieth of this same diameter), or be a part comprising a dished portion and at least one frustoconical portion, or else be a part comprising a succession of frustoconical portions, as described in more detail below in connection with FIGS. 2 to 5. Such forms are well known to a person skilled in the art and facilitate the flow of the liquid toward the recycle pipe. In addition, such forms make possible a compact configuration of the recycle cup, making it possible to have a smaller volume of the recycle zone 39 and optionally a greater catalytic volume.

The upper 42 and lower (43a, 43b, 43c, 43d) parts are continuous with one another, in other words they are successive, and the recycle pipe 25 comprises an opening positioned in the bottom of the lower part.

In the present description, cylinder is understood mean a cylinder of revolution.

This reactor is specifically designed with suitable materials which allow it to treat reactive liquids, liquid/solid slurries (that is to say, liquids containing fine solid particles dispersed within them), solids and gases at high temperature and high pressure with a preferred application in the treatment of liquid hydrocarbon cuts with hydrogen at high temperature and high pressure, that is to say at an absolute pressure of between 2 MPa and 35 MPa, preferably between 5 MPa and 25 MPa and more preferably between 6 MPa and 20 MPa, and at a temperature of between 300° C. and 550° C., preferably of between 350° C. and 500° C. and more preferably still of between 370° C. and 460° C., the favored temperature range lying between 380° C. and 440° C.

The reactor is designed with a suitable inlet pipe 12 for the injection of a heavy hydrocarbon feedstock 11 and of a hydrogen-containing gas 13. This inlet pipe is located in the lower part of the reactor, which is denoted by lower end 49 of the chamber 10 of the reactor. The outlet pipes are positioned in the upper part of the reactor, which is denoted by upper end 48 of the chamber 10 of the reactor. An outlet pipe 40 is designed in order to withdraw vapors which may contain a certain quantity of liquid. The reactor also contains a system which makes possible the introduction and the withdrawal of catalyst particles, which system is shown diagrammatically by the pipe 15 for the introduction of the fresh catalyst 16 and the pipe 17 for the withdrawal of the spent catalyst 14.

The heavy hydrocarbon feedstock is introduced through the pipe 11, while the hydrogen-containing gas is introduced through the pipe 13. The feedstock and gaseous hydrogen mixture is subsequently introduced into the chamber 10 of the reactor through the pipe 12 into the lower end 49 of the chamber of the reactor.

The incoming fluids pass through a distribution plate 18, e.g. a grid, containing suitable distributors.

In this diagram, distributors of bubble cap type 19 are shown but it is understood that any distributor known to a person skilled in the art which makes it possible to distribute the fluids originating from the pipe 12 over the entire section of the chamber 10 of the reactor, and this in as even a manner as possible, can be used.

The liquid/gas mixture flows upward and the catalyst particles are entrained in an ebullating bed movement by the gas flow and the liquid flow induced by recirculation means, e.g. the recirculation pump 20, also known as ebullation pump, which can be internal or external to the chamber 10 of the reactor.

The upward flow of liquid delivered by the pump 20 is sufficient for the mass of catalyst in the reaction zone or catalytic bed 22 to expand by at least 10% in volume, preferably from 10% to 100% in volume and more preferentially from 20% to 100% in volume, with respect to the static volume (which is to say, the volume at rest) of the catalyst bed, thus making possible the flow of gas and liquid through the chamber 10 of the reactor, as shown by the directional arrows 21.

Because of the equilibrium between the frictional forces generated by the upward flow of the liquid and of the gas, and the forces of gravity directed downward, the bed of catalyst particles reaches a top level of expansion while the liquid and the gas, which are lighter, continue to head toward the top of the chamber 10 of the reactor, beyond this solid level. In the diagram, the level of maximum expansion of the catalyst corresponds to the interface 23. Below this interface 23 is the catalytic reaction zone 22, which thus extends from the distribution plate 18 to the level 23.

Above the interface 23 is a zone 29 depleted in catalyst (in comparison with the zone 22) and containing virtually only gas and liquid. The gas comprises in particular hydrogen introduced via the pipe 13 and other gaseous compounds initially contained in the feedstock or formed by the reactions in the reactor. The catalyst particles in the reaction zone 22 are in random movement in the fluidized state, for which reason the reaction zone 22 is also described as three-phase fluidized zone.

The zone 29, having a low concentration of catalyst, above the level 23 is filled with entrained liquid and entrained gas. The gas is separated from the liquid in the upper part of the reactor, in the recycle zone 39, adjacent to the upper end 48 of the chamber 10 of the reactor, in which zone 39 is installed a recycle cup 30, in order to collect and recycle the bulk of the liquid through the central recycle pipe 25. It is important for the liquid recycled through the recycle pipe 25 to contain as little gas as possible, indeed even no gas at all, in order to avoid the phenomenon of cavitation of the pump 20.

The pipe 40 is used for the withdrawal of the gas and of a part of the liquid.

The recycle cup 30, corresponding to a broadened part at the upper end of the recycle pipe 25, delimits, with the upper end 48, the recycle zone 39. The recycle zone 39 itself comprises an upper zone predominantly containing the separated gas and a lower zone predominantly containing the recycled liquid, separated by a level not represented. A plurality of vertically orientated separation elements (27, 28) carried by the recycle cup 30 create the fluidic connection between the gas/liquid zone depleted in catalyst 29 and the recycle zone 39.

The gas/liquid mixture flows upward through the pipes of the separation elements 27 and 28. A part of the separated liquid is subsequently directed toward the recirculation pump 20 in the direction of the arrow 31 through the central recycle pipe 25 and is thus recycled to the lower end 49 of the chamber 10 of the reactor below the grid 18.

The gas separated from the liquid flows toward the vertex of the upper end 48 of the chamber 10 of the reactor and is withdrawn by the upper pipe 40. The gas withdrawn is subsequently treated in a conventional way to recover as much hydrogen as possible in order for the latter to be recycled in the chamber 10 of the reactor through the pipe 13.

The present invention does not exclude the treatment and/or the conversion of a solid hydrocarbon feedstock, e.g. coal, in the reactor in the presence of a liquid, which is a liquid hydrocarbon feedstock, e.g. a vacuum distillate (vacuum gas oil or VGO) introduced into the reactor with the solid feedstock, and the liquid produced in the reactor by reaction of the solid feedstock with hydrogen. Such a known process employing a three-phase reactor comprising a catalytic ebullating bed is the "H-Coal" process, for example the H-Coal$_{TS}$™ (TS for "two-stage") process employing two successive ebullating-bed three-phase reactors as described in the patent U.S. Pat. No. 4,874,506, operating similarly to the H-Oil™ process but adapted to the conversion of coal to give stable lighter hydrocarbon products freed from their impurities for the production of fuels. In this case, what is introduced into the three-phase reactor is a mixture of solid feedstock, e.g. coal, and a liquid feedstock, forming a suspension (or slurry). The liquid phase separated from the gas phase in the gas/liquid separation device of the reactor, and the recycle of separated liquid via the recycle cup and the recycle pipe correspond to the liquid produced in the reactor by the conversion of the coal and to the liquid hydrocarbon feedstock introduced with the coal.

The general arrangement of the circulation of the fluids is not modified in the present invention in comparison with the prior art as just described. Only the geometry of the recycle cup 30 and the scaling of the recycle zone 39, as described below, in connection with FIGS. 2 to 5, illustrating four different embodiments, are modified.

According to the invention, the geometry of the recycle cup and the scaling of the top part of the reactor make it possible to increase the catalytic volume and to reduce the non-catalytic thermal zones of formation of sediments. Consequently, the stability of the liquid effluents produced during the hydroconversion is improved while continuing to provide good gas/liquid separation at the top of the reactor for a liquid recycle, devoid as much as possible of gas, at the bottom of the reactor, bound for the catalytic reaction zone.

Figure 2:
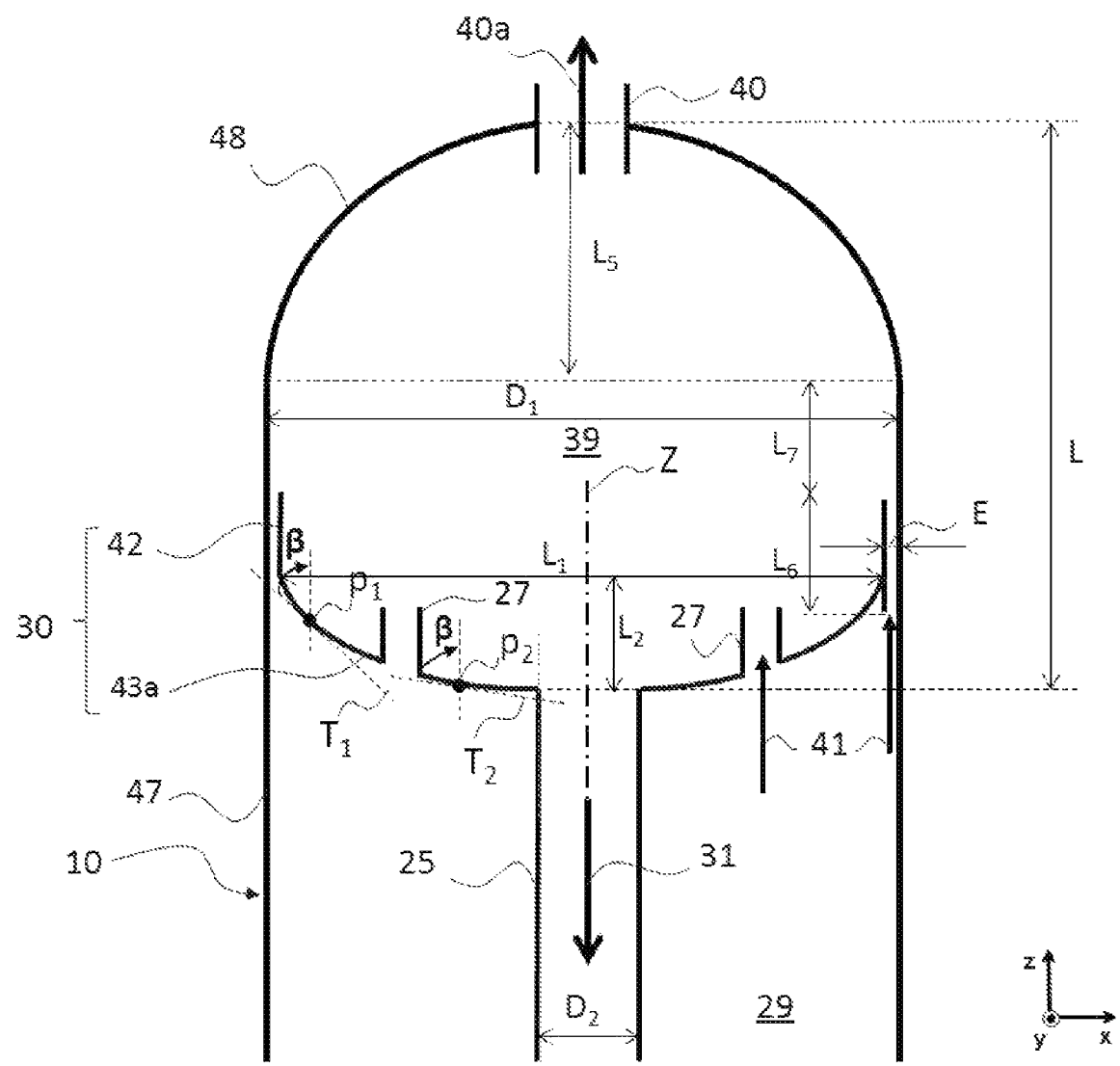
FIG. 2 is a representative diagram, in cross section, of the top part of the reactor according to the invention represented in FIG. 1 in cross section, illustrating the gas/liquid separation device and its recycle cup according to a first embodiment of the invention.

FIG. 2 is a more exact diagram of the recycle zone 39 of the reactor represented in FIG. 1. In particular, this diagram illustrates the geometry and the functioning of a reactor according to the invention and its gas/liquid separation device comprising the recycle cup 30 and the recycle pipe 25 for the separated liquid, at the top of the reactor, according to a first embodiment. FIG. 2 reveals the important geometric dimensions for the scaling of said device and of the recycle zone 39.

The zone 39 for recycle of the liquid is adjacent to the upper end 48 of the chamber 10 of the reactor and comprises, at least in part, the gas/liquid separation device configured in order to separate a gas phase and a liquid phase of the mixture originating from the catalytic reaction zone 22.

The gas/liquid separation device comprises in particular a recycle cup 30 comprising a cylindrical upper part 42 extended by a dished lower part 43a, and a pipe 25 for recycle of the liquid, located at the lowest point of the lower part 43 and in fluidic communication with the lower end 49 of the chamber via recirculation means.

The dished lower part 43a has a decreasing section and a variable angle of inclination β with respect to the axis of resolution (Z) of the cylindrical upper part, which axis of revolution is coincident with the vertical (z) in the functioning position of the chamber 10. The angle of inclination β is the angle formed between the tangent at a point of the lower part 43a and an axis parallel to the axis of revolution Z passing through this point (the vertical). The angle β preferably varies between 0° and 180°. The angle β preferably increases in the direction of (downward) flow of the liquid, i.e. in the direction of the recycle pipe 25. Thus, in FIG. 2, the value of the angle β at the point $p_1$, formed between the tangent $T_1$ and the vertical, is different from the value of the angle β at the point $p_2$, formed between the tangent $T_2$ and the vertical, and in this instance is smaller. The dished lower part can be characterized by the $L_2/L_1$ ratio, $L_2$ being the height of the dished end and $L_1$ being the diameter of the cylindrical upper part 42. The dished lower part can be of a type described according to the referenced standards already mentioned above and in particular characterized by a dishing radius Ri and a knuckle radius Rc. Preferably, the dished lower part of the recycle cup 30 is an elliptical dished end (for example as defined in standardizing document NF E 81-103). Preferably, the dished lower part has an $L_2/L_1$ ratio of between 0.01 and 0.7, preferably of between 0.02 and 0.6 and more preferentially of between 0.1 and 0.5, $L_1$ being the diameter of the cylindrical upper part 42 of the recycle cup. For example, the $L_2/L_1$ ratio is equal to 0.25.

This geometry with a decreasing section and a variable angle of inclination β of the lower part makes it possible to have a greater catalytic volume/thermal volume ratio in comparison with the known reactors comprising conventional recycle cups, for one and the same catalyst and with isoexpansion, i.e. same degree of expansion of the catalyst, resulting in particular in benefits in terms of stability of the effluents produced during the hydroconversion of heavy feedstocks and in terms of general performance qualities of the hydroconversion process. Thermal volume is understood to mean the zones of the reactor outside the ebullating-bed catalytic zone 22 (zones 39, 29, pipe 25, lower part 49). The thermal volume does not comprise supported catalyst, apart from fines. Catalytic volume is understood to mean the ebullating-bed catalytic reaction zone 22. A reduced thermal volume makes it possible in particular to prevent thermal cracking with the formation of fouling precursors (very viscous and/or sticky entities composed of asphaltenes and coke), which are not desired in a hydroconversion process, and an enhanced catalytic volume makes possible in particular greater hydrotreating catalytic performance qualities and stabilization of the fouling precursors.

The recycle cup 30 is positioned above the catalytic reaction zone 22 and more particularly above the zone 29 itself surmounting the catalytic reaction zone 22, and delimits, with at least the upper end 48 of the chamber, the recycle zone 39. The recycle zone has a height L which can be defined as being the distance between the vertex of the recycle pipe 25 and the vertex of the upper end 48, as represented in FIG. 2.

According to this first embodiment, the dished lower part 43a is concave (hollowed out).

The lower part 43a is provided with vertical pipes 27 for the passage of the gas/liquid mixture through the recycle cup, which are already described above in connection with FIG. 1. These gas/liquid passage and separation elements can be simple vertical pipes which pass through the wall of the lower part 43a, as represented, but can also be any other gas/liquid passage and separation element as described in the patent applications FR 3 058 420 A1 and FR 3 058 421 A1.

In particular, after the fashion of what is described in the application FR 3 058 420 A1, the lower part 43a can be provided with a plurality of vertical separation elements 27 operating in parallel, each separation element 27 having a pipe for admission of the gas/liquid mixture open on the surface of the part 43a and rising up to a given height inside the recycle zone 39, and ending in a succession of two elbows; a first elbow located in the plane (ZY) defined by the substantially vertical axis Z and an axis Y belonging to the plane (XY) perpendicular to the axis Z, and a second elbow located in the plane (XY), the axis X being itself perpendicular to the axis Y. Preferably, the angle of orientation of the first elbow in the plane (ZY), the angle of orientation of the second elbow in the plane (XY) and the distance separating two successive elbows have specific values: the first elbow in the plane (ZY) can have its orientation defined by its angle $\alpha_1$ of between 45° and 315°, preferably between 60° and 300° and in a preferred way between 80° and 200°, and the second angle located in the plane (XY) can have its orientation defined by its angle $\gamma_1$ of between 0° and 135°, preferably between 10° and 110° and in a preferred way between 30° and 100°, the two successive elbows being separated by a distance of between half the diameter of the admission pipe and 4 times the diameter of the admission pipe.

Alternatively, after the fashion of what is described in the application FR 3 058 421 A1, the lower part 43a can be provided with a plurality of vertical separation elements 27 operating in parallel, each separation element 27 having a pipe for admission of the gas/liquid mixture open on the surface of the part 43a and rising up to a given height inside the recycle zone 39, and being covered over with an upper cap provided with a pipe for discharge of the gas located in the upper part of said cap, and with a tubular element substantially coaxial with the admission pipe and which makes possible the return of the liquid, each element 27 being equipped with a helical spiral located inside the admission pipe in the upper part of the elements 27. Preferably, the helical spiral forms an angle $\gamma_1$ with the horizontal of between 10° and 80°, preferably between 20° and 70° and in a preferred way between 35° and 60°, and this helical spiral preferably performs, over the whole of its height, a number of rotations of between 0.5 and 4, each rotation corresponding to 1 360° revolution, and preferably between 0.5 and 2 360° revolutions.

The lower part 43a of the recycle cup can also comprise other types of known gas/liquid passage and separation elements.

According to one embodiment, an annular space E is formed between the cylindrical upper part of the recycle cup and the side wall of the chamber. This space then constitutes a passage for the gas/liquid mixture after the fashion of the pipes 27, and can thus participate in the gas/liquid separation. The width of this annular space, defined perpendicularly to the side wall of the chamber and to the cylindrical upper part of the recycle cup, is preferably of between 0.01 m and $D_1/3$ m, more preferentially of between 0.01 m and $D_1/4$ and more preferably still of between 0.01 m and $D_1/8$.

According to one embodiment, the cylindrical upper part of the recycle cup is formed by the side wall of the chamber. This is a configuration where the cup extends over the entire section of the chamber, without annular space E between the cup and the side wall of the chamber of the reactor. According to this embodiment, the gas/liquid mixture enters the recycle zone through the recycle cup solely via the pipes 27. In this case, the gas and liquid velocities are greater and the gas/liquid separation in the elements 27 described above is improved.

The diameter $L_1$ of the cylindrical upper part 42 of the recycle cup results directly from the diameter $D_1$ of the chamber of the reactor and from the length of the annular space E. Thus, when such an annular space E exists, the diameter $L_1$ of the cylindrical upper part 42 of the recycle cup is equal to the difference between the diameter $D_1$ of the chamber of the reactor and two times the width of the annular space E. $L_1$ is thus preferably of between $1.1 \times D_2$ and $D_1 - 2 \times 0.01$ m, more preferentially of between $1.5 \times D_2$ and $D_1 - 2 \times 0.01$ m and more preferably still of between $2 \times D_2$ and $D_1 - 2 \times 0.01$, $D_2$ being the diameter of the recycle pipe 25.

By way of indication and without being limiting, the diameter $D_1$ can be between 0.1 m and 30 m, preferably between 0.5 m and 20 m and very preferably between 1 m and 10 m.

The height $L_6$ of the cylindrical upper part 42 is preferably of between $0.001 \times D_1$ and $2 \times D_1$, more preferentially of between $0.1 \times D_1$ and $D_1$ and more preferably of between $0.15 \times D_1$ and $0.9 \times D_1$.

The distance $L_7$ defined between the vertex of the cylindrical upper part 42 and the bottom of the upper end 48 of the chamber is preferably of between $0.001 \times D_1$ and $2 \times D_1$, more preferentially of between $0.1 \times D_1$ and $D_1$ and more preferably of between $0.15 \times D_1$ and $0.9 \times D_1$.

According to the invention, the upper end of the chamber preferably has a convex shape and advantageously exhibits an $L_5/D_1$ ratio of between 0.01 and 20, $L_5$ being the height of the upper end of the chamber. More preferentially, the $L_5/D_1$ ratio is of between 0.02 and 10 and more preferentially still is of between 0.1 and 5. For example, the $L_5/D_1$ ratio is equal to 4.

The recycle pipe 25 is preferably cylindrical. The diameter $D_2$ of the recycle pipe is preferably of between 0.1 m and 3 m, more preferentially of between 0.3 m and 2 m. The diameter $D_2$ is preferably fixed in order to have a liquid velocity in the pipe 25 of between 0.01 m/s and 80 m/s, preferably between 0.02 m/s and 40 m/s and in a preferred way between 0.05 m/s and 10 m/s.

The mixture of gas and of liquid originating from the zone 29 of the chamber of the reactor has an upward flow shown by the directional arrows 41 and is introduced through the pipes 27 and optionally via the annular space E, if it exists, which constitute a fluidic link between the zone 29 and the recycle zone 39. Said mixture can also contain catalyst fines (usually with a diameter of less than 500 microns) or any other dispersed solid, such as precipitated asphaltenes, coke particles or metal sulfides, such as nickel, vanadium, iron or molybdenum sulfides.

In the recycle zone 39, there exists a level (not represented) which separates an upper part of the zone 39 predominantly containing the separated gas from a lower part predominantly containing the recycled liquid. The outlet of the pipes 27 is generally located above this level. The separated liquid resulting from the pipe 27 flows toward the bottom via the lower part 43a of the recycle cup and is collected by the central recycle pipe, in order to preferably be taken up again by the recycle pump 20.

The bulk of the liquid therefore separated 31 is thus recycled toward the lower end of the chamber of the reactor via the recycle pipe 25, with recirculation means, preferably comprising the ebullation pump 20. More specifically, the recycled liquid is sent by the recirculation means into the end 49 of the chamber, below the distribution grid 18. The gas 40a, which can be accompanied by a part of unseparated liquid, is discharged from the chamber of the reactor through the pipe 40. The pipe 40 can comprise slits at its open end in the chamber of the reactor in its lower end which can make it possible to fix the height of the liquid/gas interface.

Figure 3:
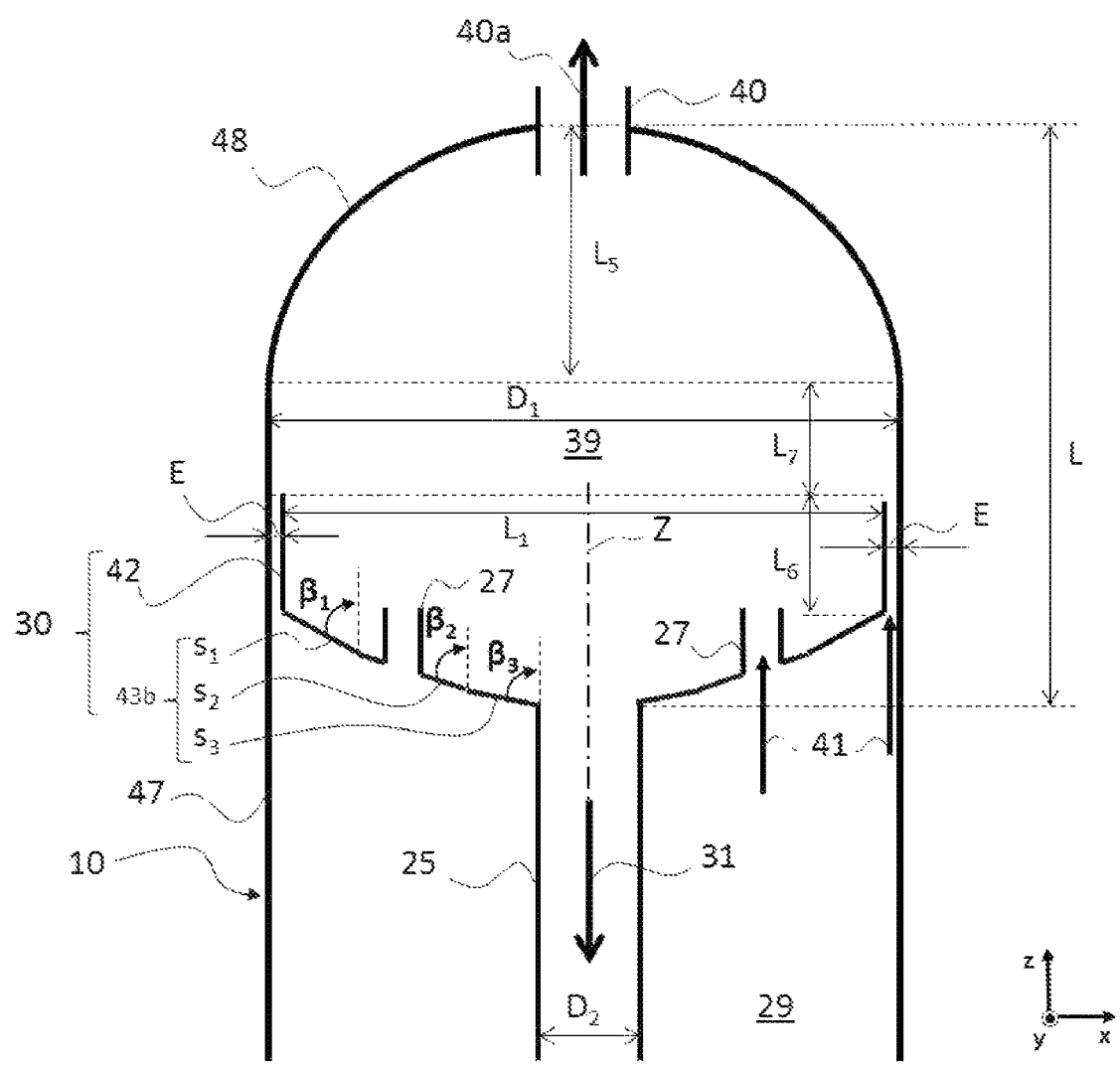
FIG. 3 is a representative diagram, in cross section, of the top part of the reactor according to the invention represented in FIG. 1, illustrating the gas/liquid separation device and its recycle cup according to a second embodiment of the invention.

FIG. 3 illustrates a second embodiment of the reactor according to the invention, in which the recycle cup 30 comprises a lower part 43b formed by a succession of frustoconical portions (s1, s2, s3). This second embodiment is identical in every respect to the first embodiment, described in connection with FIG. 2, except for said lower part. According to this second embodiment, the lower part 43b comprises, and is preferably formed by, a succession of frustoconical portions $s_p$, with an angle of inclination $\beta_p$ with respect to the Z axis. The angle $\beta_p$ of two successive frustoconical portions is different. For each frustoconical portion, the vertex of the cone points downward, that is to say points toward the recycle pipe 25 at the bottom of the lower part 43b. The section of the lower part 43b is thus indeed decreasing and has a variable angle of inclination.

Although the angle of inclination $\beta_p$ of a second frustoconical portion situated directly under a first frustoconical portion, in the direction of the downward flow of the liquid in the cup, can be lower than that of the first frustoconical portion, the angle of inclination $\beta_p$ is preferably increasing in the direction of the recycle pipe 25. For example, the lower part is a succession of three frustoconical portions with respective angles of inclination $\beta_1$, $\beta_2$ and $\beta_3$, with respect to the axis of revolution Z, as illustrated in FIG. 3. The angle of each frustoconical portion becomes greater the closer the portion is to the bottom of the lower part, that is to say that it is increasing in the direction of the downward flow of the liquid in the cup, in other words in the direction of the recycle pipe 25.

The number of frustoconical portions Ns can be between 2 and 30, preferably between 2 and 10 and in a preferred way between 2 and 5, and more preferably still between 3 and 5.

When Ns is sufficiently large, for example greater than 10, the lower part approximates to a dished part configuration.

The angle of inclination $\beta_p$ of a frustoconical portion $s_p$, the index p ranging from 2 to Ns, is advantageously of between 5° and 70°, preferably of between 15° and 60° and very preferably of between 30° and 50°.

Figure 4:
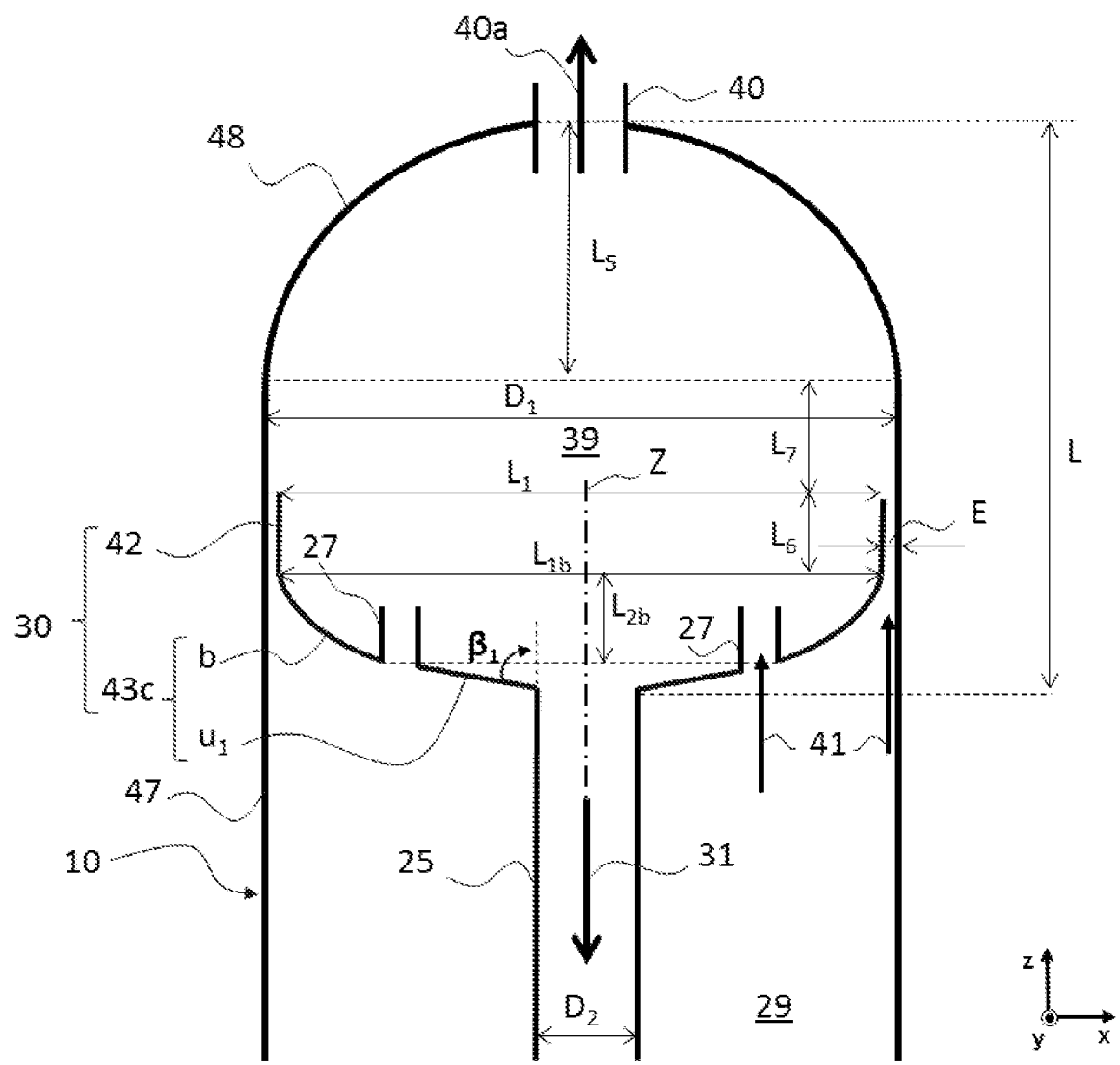
FIG. 4 is a representative diagram, in cross section, of the top part of the reactor according to the invention represented in FIG. 1, illustrating the gas/liquid separation device and its recycle cup according to a third embodiment of the invention.

FIG. 4 illustrates a third embodiment of the reactor according to the invention, in which the recycle cup 30 comprises a lower part 43c comprising at least one cone vertex frustoconical portion pointing downward and at least one dished portion, said frustoconical portion preferably being surmounted by said dished portion. Preferably, the lower part 43c comprises just one dished portion b surmounting the frustoconical portion u1 comprising the recycle pipe 25, as illustrated in FIG. 4. This configuration, without an abrupt angle at the junction between the cylindrical upper part and the lower part of the cup, makes it possible in particular to avoid points favorable to the sedimentation of solid particles close to the wall of the upper part of the cup. In this case, $L_{1b}$ is equal to $L_1$, $L_{1b}$ being the greatest diameter of the dished portion b of said lower part having a decreasing section and of variable angle of inclination and $L_1$ being the diameter of the cylindrical upper part of the recycle cup. However, the inverse configuration (not represented) is also possible, according to which the dished portion is surmounted by the frustoconical portion. In the latter case, the $L_{1b}/L_1$ ratio can be of between 0.1 and 1, preferably between 0.2 and 1 and more preferentially between 0.5 and 1.

According to this embodiment, the frustoconical portion $u_1$ can have an angle of inclination $\beta_1$ with respect to the axis of revolution Z which can be of between 5° and 70°, preferably of between 15° and 60° and very preferably of between 30° and 50°.

Alternatively, the dished portion is surmounted by a succession of frustoconical portions similar to that described for the second embodiment of the invention in connection with FIG. 3, without any need to repeat the description thereof here.

The dished portion b is of the same type as that described for the first embodiment and again its description is not repeated here, except that the height $L_{2b}$ of the dished portion b does not constitute the entire height of the lower part 43c but only a part of that height, the other part being that formed by the height of the frustoconical portion or portions. The dished portion b can thus be characterized by an $L_{2b}/L_{1b}$ ratio of between 0.01 and 0.7, preferably of between 0.02 and 0.6 and more preferentially of between 0.1 and 0.5, $L_{2b}$ being the height of the dished portion b and $L_{1b}$ being the greatest diameter of the dished portion of said lower part having a decreasing section and of variable angle of inclination. In the case of a configuration such as that illustrated in FIG. 4, with a single dished portion b surmounting the frustoconical portion $u_1$, $L_{1b}$ is equal to $L_1$. For example, the $L_{2b}/L_{1b}$ ratio is equal to 0.25.

Figure 5:
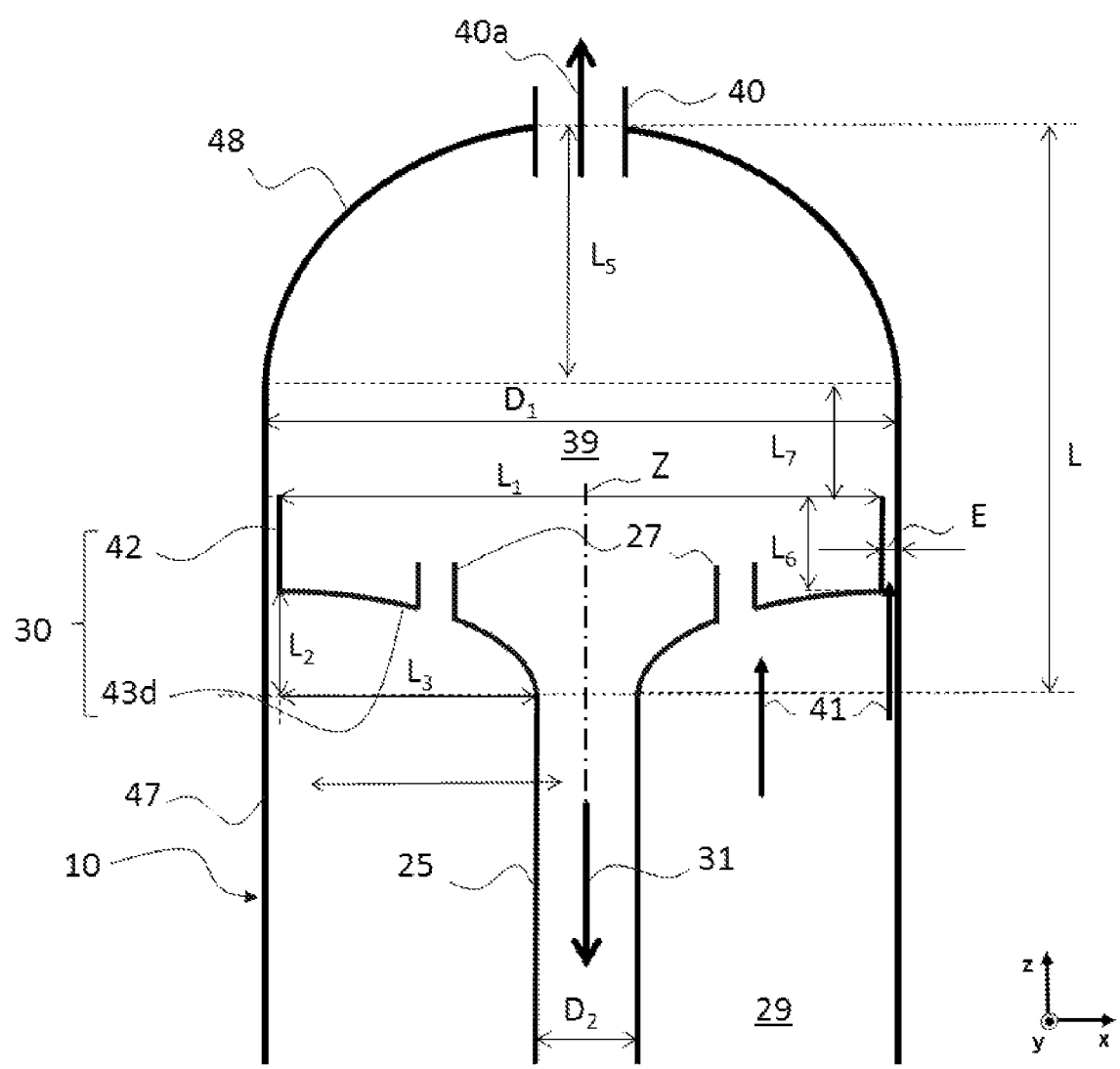
FIG. 5 is a representative diagram, in cross section, of the top part of the reactor according to the invention represented in FIG. 1, illustrating the gas/liquid separation device and its recycle cup according to a fourth embodiment of the invention.

FIG. 5 illustrates a fourth embodiment of the reactor according to the invention, in which the recycle cup 30 comprises a lower part 43d with an inverted elliptical restriction between the cylindrical upper part 42 of the cup and the inlet of the recycle pipe 25. The elliptical restriction of each side of the pipe 25 is defined by the $L_2/L_3$ ratio, where $L_2$ is the vertical distance between the bottom of the cylindrical upper part 42 and the upper part of the pipe 25 and $L_3$ is the horizontal distance between the wall of the cylindrical upper part 42 and the external wall of the pipe 25. $L_2/L_3$ is preferably of between 0.01 and 0.7, more preferentially of between 0.02 and 0.6 and more preferentially still of between 0.1 and 0.5. The advantage of this embodiment is that the elliptical restriction between the bottom of the cylindrical upper part 42 and the inlet of the pipe 25 makes it possible for the recycled liquid to more rapidly accelerate in this transition zone, in comparison with the other configurations, and thus makes it possible to decrease the potential zones for deposition of solids. According to this fourth embodiment, the angle β, which can be defined as in FIG. 2 as the angle formed between the tangent at a point of the lower part 43d and the vertical at this point, preferably decreases in the (downward) direction of flow of the liquid, i.e. in the direction of the recycle pipe 25.

The present invention also relates to a process for the hydroconversion of a hydrocarbon feedstock comprising a reactor according to the invention. It can, for example, be a process for the hydroconversion of a liquid hydrocarbon feedstock or of a solid hydrocarbon feedstock, e.g. coal.

According to one embodiment, the present invention relates to a process for the hydroconversion of a liquid hydrocarbon feedstock, preferably a heavy liquid feedstock, comprising a reactor according to the invention, in which:
hydrogen and the liquid hydrocarbon feedstock are introduced into the lower end 49 of the chamber of the reactor according to an upward stream sufficient to produce a random movement of a catalyst in the form of particles in the catalytic reaction zone 22;
the catalyst is maintained as an ebullating bed in the catalytic reaction zone 22 with an expansion in volume of between 10% and 100%, with respect to the static volume of said catalyst, by the injection of recycled liquid, preferably by means of a pump, resulting from the recycle zone adjacent to the upper end of the chamber via the recycle pipe 25, in order to carry out the chemical reactions of the hydrocarbon feedstock with the hydrogen;
a gas phase is separated from a liquid phase of a mixture originating from the catalytic reaction zone and sent into the pipes 27 of the recycle cup 30, a part of the liquid thus separated constituting the recycled liquid sent into the lower end of the chamber of the reactor; and
the gas and the other part of the separated liquid present in the recycle zone 39 are discharged from the reactor.

The process has already been described in part above in connection with FIG. 1.

Preferably, the operating conditions of the reactor are as follows:
an absolute pressure of between 2 MPa and 35 MPa, preferably between 5 MPa and 25 MPa and more preferably between 6 MPa and 20 MPa, and
a temperature of between 300° C. and 550° C., preferably of between 350° C. and 500° C. and more preferably of between 370° C. and 460° C., the favored temperature range lying between 380° C. and 440° C.

The feedstock is preferably a heavy hydrocarbon feedstock containing a fraction of at least 50% by weight having a boiling point of at least 300° C., preferably of at least 350° C. and more preferably still of at least 375° C.

This heavy hydrocarbon feedstock can be a crude oil, or originate from the refining of a crude oil or from the processing of another hydrocarbon source in a refinery.

Preferably, the feedstock is a crude oil or is formed of atmospheric residues and/or of vacuum residues resulting from the atmospheric and/or vacuum distillation of a crude oil.

The heavy hydrocarbon feedstock can also be formed of atmospheric and/or vacuum residues resulting from the atmospheric and/or vacuum distillation of effluents originating from thermal conversion, hydrotreating, hydrocracking and/or hydroconversion units.

Preferably, the feedstock is formed of vacuum residues. These vacuum residues generally contain a fraction of at least 50% by weight having a boiling point of at least 450° C. and generally of at least 500° C., indeed even of at least 540° C. The vacuum residues can come directly from the crude oil, or from other refining units, such as, inter alia, the hydrotreating of residues, the hydrocracking of residues and the visbreaking of residues. Preferably, the vacuum residues are vacuum residues resulting from the vacuum distillation column of the primary (straight-run) fractionation of the crude oil.

The feedstock can also be formed of vacuum distillates, originating either directly from the crude oil or from cuts originating from other refining units, such as, inter alia, cracking units, such as fluid catalytic cracking (FCC) and hydrocracking, and from thermal conversion units, such as coker units or visbreaking units.

It can also be formed of aromatic cuts extracted from a unit for the production of lubricants, deasphalted oils resulting from a deasphalting unit (raffinates of the deasphalting unit) or asphalts resulting from a deasphalting unit (residues of the deasphalting unit).

The heavy hydrocarbon feedstock can also be a residual fraction resulting from direct coal liquefaction (an atmospheric residue and/or a vacuum residue resulting, for example, from the H-Coal™ process), a vacuum distillate resulting from direct coal liquefaction, such as, for example, the H-Coal™ process, or else a residual fraction resulting from the direct liquefaction of lignocellulose biomass, alone or as a mixture with coal and/or a petroleum fraction.

All these feedstocks can be used to form the heavy hydrocarbon feedstock treated according to the invention, alone or as a mixture.

The heavy hydrocarbon feedstock contains impurities, such as metals, sulfur, nitrogen or Conradson carbon. It can also contain heptane insolubles, also referred to as $C_7$ asphaltenes. The contents of metals can be greater than or equal to 20 ppm by weight, preferably greater than or equal to 100 ppm by weight. The sulfur content can be greater than or equal to 0.1%, indeed even greater than or equal to 1%, and can be greater than or equal to 2% by weight. The content of $C_7$ asphaltenes (heptane-insoluble compounds according to the standard NFT60-115 or the standard ASTM D 6560) amounts to at least 1% and is often greater than or equal to 3% by weight. $C_7$ asphaltenes are compounds known for inhibiting the conversion of residual cuts, both by their ability to form heavy hydrocarbon residues, commonly referred to as coke, and by their tendency to produce sediments which greatly limit the operability of the hydrotreating and hydroconversion units. The Conradson carbon content can be greater than or equal to 0.5%, indeed even at least 5%, by weight. The Conradson carbon content is defined by the standard ASTM D 482 and represents, for a person skilled in the art, a well-known evaluation of the amount of carbon residues produced after a pyrolysis under standard temperature and pressure conditions.

Several reactors according to the invention can be operated in series or in parallel, or with other three-phase reactors according to the prior art.

Advantageously, two successive hydroconversion stages are carried out, with optionally a separation stage between the hydroconversion stages, it being possible for each hydroconversion stage to employ one or more three-phase reactors operating as an ebullating bed according to the invention. A stage of fractionation of at least a part of the hydroconverted effluent resulting from the final hydroconversion stage is generally carried out, with the objective of separating the effluents at different cut points and advantageously of obtaining at least one heavy liquid fraction, referred to as unconverted vacuum residue, predominantly boiling at a temperature of greater than 300° C., preferably of greater than 500° C. and in a preferred way of greater than 540° C.

These stages are advantageously carried out by employing at least one reactor according to the invention, and can employ other devices, and under operating conditions of the H-Oil™ process, which are described, for example, in the U.S. Pat. Nos. 4,521,295 or 4,495,060 or 4,457,831 or in the paper Aiche, Mar. 19-23, 1995, Houston, Tex., paper number 46d, "Second generation ebullated bed technology".

The H-Oil™ process is a process for the hydroconversion of heavy hydrocarbon cuts, of vacuum gas oil (VGO) type, or residues, which thus brings together the liquid hydrocarbon phase, the hydrogen gas phase dispersed in the form of bubbles, and the catalyst itself dispersed in the form of particles with a size typically of between 0.2 mm and 2 mm.

The hydroconversion reactor is operated as a three-phase fluidized bed, also referred to as ebullating bed, as already described above. The reactor advantageously comprises a recirculation pump which makes it possible to maintain the catalyst as an ebullating bed by continuous recycling of at least a part of a liquid fraction withdrawn at the upper end of the reactor and reinjected at the lower end of the reactor.

The rate of liquid recycling, an important characteristic of the reactor used in a process of H-Oil™ type, and defined as the ratio of the recycled liquid flow rate to the incoming liquid feedstock flow rate, is generally of between 1 and 10.

The hydroconversion catalyst used in the hydroconversion stages of the process according to the invention contains one or more elements from Groups 4 to 12 of the Periodic Table of the Elements, which can be deposited on a support. Use may advantageously be made of a catalyst comprising a support, preferably an amorphous support, such as silica, alumina, silica/alumina, titanium dioxide or combinations of these structures, and very preferably alumina, and at least one metal from Group VIII chosen from nickel and cobalt and preferably nickel, said element from Group VIII preferably being used in combination with at least one metal from Group VIb chosen from molybdenum and tungsten and preferably the metal from Group VIb is molybdenum.

The hydroconversion catalyst can be a catalyst comprising an alumina support and at least one metal from Group VIII chosen from nickel and cobalt, preferably nickel, said element from Group VIII being used in combination with at least one metal from Group VIb chosen from molybdenum and tungsten; preferably, the metal from Group VIb is molybdenum. Preferably, the hydroconversion catalyst comprises nickel as element from Group VIII and molybdenum as element from Group VIb. The nickel content is advantageously of between 0.5% and 10%, expressed by weight of nickel oxide (NiO), and preferably between 1% and 6% by weight, and the molybdenum content is advantageously of between 1% and 30%, expressed by weight of molybdenum trioxide ($MoO_3$), and preferably between 4% and 20% by weight. This catalyst is advantageously used in the form of extrudates or of beads.

The present invention does not exclude the use, in addition to the supported catalyst, of an entrained catalyst (slurry) which enters the reactor with the feedstock and which is entrained outside the reactor with the effluents. Reference is sometimes made to a hybrid bed functioning for denoting the functioning of such a reactor employing catalysts with very different particle sizes, simultaneously comprising at least one catalyst which is maintained in the reactor as an ebullating bed and at least one entrained catalyst.

According to another embodiment, the present invention relates to a process for the hydroconversion of a solid hydrocarbon feedstock, e.g. coal, comprising a reactor according to the invention, in which:

hydrogen and a mixture of the solid hydrocarbon feedstock and of a liquid hydrocarbon feedstock are introduced into the lower end 49 of the chamber of the reactor according to an upward stream sufficient to produce a random movement of a catalyst in the form of particles in the catalytic reaction zone 22;

the catalyst is maintained as an ebullating bed in the catalytic reaction zone 22 with an expansion in volume of between 10% and 100%, with respect to the static volume of said catalyst, by the injection of recycled liquid, preferably by means of a pump, resulting from the recycle zone adjacent to the upper end of the chamber via the recycle pipe 25, in order to carry out the hydroconversion reactions of the solid hydrocarbon feedstock;

a gas phase is separated from a liquid phase of a mixture originating from the catalytic reaction zone and sent into the pipes 27 of the recycle cup 30, a part of the liquid thus separated constituting the recycled liquid sent into the lower end of the chamber of the reactor; and at least the gas and the other part of the separated liquid present in the recycle zone 39 are discharged from the reactor.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 19/03.945, filed Apr. 12, 2019, are incorporated by reference herein.

EXAMPLES

The examples below show some of the advantages of the invention in the context of an implementation of the invention for the hydroconversion of heavy hydrocarbon feedstocks according to a process of H-Oil™ type, in particular the gains in terms of catalytic volume/thermal volume ratio, of hydroconversion performance qualities and a fall in the content of sediments in the effluents.

Example 1: Catalytic Volume/Thermal Volume Ratio

In this first example, the use of a reactor according to the prior art comprising a recycle cup with an angle of inclination of 45° (reactor A) and of examples of reactors according to the invention comprising a recycle cup according to the first, second and third embodiments described above (reactors B, C and D respectively), for the hydroconversion of a heavy feedstock, are compared.

The main geometric characteristics of the simulated reactors, and also the performance qualities, calculated in terms of catalytic volume/thermal volume ratio, are presented in table 1 below. The geometric parameters of the reactors are identical, with the exception of the angle of inclination of the frustoconical lower part of the recycle cup. The degree of expansion of the catalyst is identical in the four reactors.

TABLE 1

|  | Reactor A (prior art) | Reactor B (according to the invention) | Reactor C (according to the invention) | Reactor D (according to the invention) |
|---|---|---|---|---|
| Diameter $D_1$ (m) | 4.9 | 4.9 | 4.9 | 4.9 |
| Diameter $D_2$ (m) | 0.8 | 0.8 | 0.8 | 0.8 |
| Angle β | 45° | — | — | — |
| Angle β1 | | — | 45° | 75° |
| Angle β2 | | — | 60° | — |
| Angle β3 | | — | 75° | — |
| $L_2/L_1$ | | 0.25 | | 0.25 |
| Gain in height of the catalytic bed 22 (m) | — | 0.83 | 0.69 | 1.04 |
| Catalytic volume 22 | 532.5 m³ | 547.6 m³ | 545.1 m³ | 551.5 m³ |
| Thermal volume (without catalyst) | 123.8 m³ | 108.7 m³ | 111.2 m³ | 104.8 m³ |
| Catalytic bed volume/thermal volume ratio | 4.3 | 5.0 | 4.9 | 5.3 |

This example shows a gain in catalytic volume and a fall in the thermal volume in the cases of the reactors B, C and D (according to the invention) in comparison with the reactor A. The catalytic volume/thermal volume ratio is thus significantly increased in the case of the reactors B, C and D (17% for the reactor B, 14% for the reactor C and 22% for the reactor D).

In the case of the reactor C, the gain in catalytic volume is related to the fact that the decrease in the length L makes it possible to increase the height of the catalytic bed.

Example 2: Content of Sediments and Other Hydroconversion Performance Qualities

This second example is targeted at showing the impact, for the hydroconversion of a heavy feedstock, of a gain in catalytic volume/thermal volume ratio, furthermore made possible by the use of an example of reactors according to the invention (reactors B, C and D) as shown in example 1, in particular with regard to the content of sediments in the effluents produced and with regard to some hydroconversion performance qualities (conversion of the feedstock and content of asphaltenes in the effluents).

In this second example, a heavy hydrocarbon feedstock, the main characteristics of which are given in table 2 below, is sent into a hydroconversion process employing two three-phase reactors in series in the presence of hydrogen, according to the operating conditions given in table 3 below.

In this example, it is not a matter of testing an example of reactor according to the invention but of testing a reactor exhibiting a different catalytic volume/thermal volume ratio.

In a first case tested (Case 1), the two three-phase reactors in series, without recycle cup, have a ratio equal to 0.64.

In a second case tested (Case 2), the two three-phase reactors in series, without recycle cup, have a catalytic volume/thermal volume ratio equal to 1.1.

The degree of expansion of the catalyst is 40% for both cases.

It should be remembered that this second example makes it possible to show the impact of a gain in catalytic volume/thermal volume ratio, which can be done without having to directly employ the reactor according to the invention but more simply by employing a conventional reactor, without recycle cup, exhibiting a greater catalytic volume/thermal volume ratio.

TABLE 2

| Feedstock |  | Vacuum residue (VR) |
|---|---|---|
| Content of 540° C.+ | % by weight | 82 |
| Density |  | 1.024 |
| Nickel + Vanadium | ppm by weight | 217.5 |
| Sulfur | % by weight | 4.89 |
| $C_7$ As | % by weight | 12.6 |
| Conradson Carbon (CCR) | % by weight | 21.6 |
| IP-375 | % by weight | <0.01 |

TABLE 3

| Operating conditions and performance qualities obtained |  | Case 1 | Case 2 |
|---|---|---|---|
| Reactor HSV | h⁻¹ | 0.2 | 0.2 |
| Total P | MPa | 16 | 16 |
| Temperature | ° C. | 420 | 420 |
| Catalytic volume/Thermal volume | — | 0.64 | 1.1 |
| Catalyst age | bbl/lb | 0.6 | 0.6 |
| HDC540° C.+ | % by weight | 77 | 76 |

TABLE 3-continued

| Operating conditions and performance qualities obtained | | Case 1 | Case 2 |
|---|---|---|---|
| HDS | % by weight | 83 | 86 |
| HDM | % by weight | 92 | 94 |
| HDC$_7$As | % by weight | 74 | 83 |
| HDCCR | % by weight | 69 | 76 |
| Sediments of 350° C.+ effluent cut (measured by IP-375) | % by weight | 0.82 | 0.13 |

The comparison between these two cases demonstrates the beneficial effect of the increase in the catalytic volume with respect to the thermal volume (change from a catalytic volume/thermal volume ratio of 0.64 with regard to case 1 to 1.1 with regard to case 2) on the hydrotreating performance qualities and in particular one of the most important effects relates to the stability of the effluent liquid heavy cuts, quantified by the sediments according to the IP-375 method. It is noted that the hydroconversion of the C$_7$ asphaltenes, which are heptane-insoluble compounds according to the standard NFT60-115 or the standard ASTM D 6560 (HDC$_7$As), is also greater in case 2, the hydroconversion performance qualities of the feedstock (HDC540+: fraction boiling at a temperature greater than or equal to 540° C., which is the unconverted fraction) being as significant in case 2 as in case 1.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A three-phase reactor for reacting a hydrocarbon feedstock with hydrogen, comprising:
    a vertically positioned elongated chamber (10) comprising upper (48) and lower (49) ends and a side wall (47), said chamber comprising a catalytic reaction zone (22) adjacent to the lower end (49) and suitable for the reaction of the hydrocarbon feedstock and of a gas in the presence of an ebullating bed catalyst, and a zone for recycle of a liquid (39) adjacent to the upper end (48),
    a gas/liquid separation device configured in order to separate a gas phase and a liquid phase of a mixture originating from said catalytic reaction zone (22), and comprising at least:
    a recycle cup (30) comprising a cylindrical upper part (42) extended by a lower part (43) which is provided with vertical pipes (27) for the passage of said mixture through the recycle cup, said lower part (43a, 43b, 43c, 43d) having a decreasing section and a variable angle of inclination β with respectt to the axis of revolution (Z) of said cylindrical upper part (42), said recycle cup (30) being positioned above the catalytic reaction zone (22) and delimiting, with at least the upper end (48) of the chamber, the recycle zone (39), and
    a pipe (25) for recycle of the liquid located at the apex of said lower part (43) and in fluidic communication with the lower end (49) of the chamber by recirculation means.

2. The reactor according to claim 1, in which said lower part having a decreasing section and of variable angle of inclination (43a, 43c, 43d) comprises a dished portion (43b, b, 43d).

3. The reactor according to claim 2, in which the cylindrical upper part (42) of the recycle cup has a diameter L$_1$ and wherein said lower part having a decreasing section and of variable angle of inclination (43a, 43c, 43d) is a dished portion with a height L$_2$, and the L$_2$/L$_1$ ratio is between 0.01 and 0.7.

4. The reactor according to claim 2, in which said lower part having a decreasing section and of variable angle of inclination (43c) additionally comprises at least one frustoconical portion (u$_1$), wherein L$_{2b}$ is the height of the dished portion (b) and L$_{1b}$ is the greatest diameter of said lower part having a decreasing section and of variable angle of inclination, wherein the L$_{2b}$/L$_{1b}$ ratio is between 0.01 and 0.7.

5. The reactor according to claim 1, in which said lower part having a decreasing section and of variable angle of inclination (43b) comprises a succession of frustoconical portions (s$_1$, s$_2$, s$_3$).

6. The reactor according to claim 1, in which said lower part having a decreasing section and of variable angle of inclination (43d) comprises an inverted elliptical restriction between the cylindrical upper part (42) and the recycle pipe (25), wherein L$_2$ is the vertical distance between the bottom of the cylindrical upper part (42) and the upper part of the pipe (25) and L$_3$ is the horizontal distance between the cylindrical upper part (42) and the external wall of the pipe (25), and the L$_2$/L$_3$ ratio.

7. The reactor according to claim 1, in which the upper end (48) of the chamber has a convex shape, wherein L$_5$ is the height of the upper end of the chamber and D$_1$ is the diameter of the chamber of the reactor in the recycle zone, and the L$_5$/D$_1$ ratio is between 0.01 and 20.

8. The reactor according to claim 1, in which the cylindrical upper part (42) of the recycle cup (30) is formed by the side wall (47) of the chamber.

9. The reactor according to claim 1, in which an annular space (E) is formed between the cylindrical upper part (42) of the recycle cup (30) and the side wall (47) of the chamber.

10. The reactor according to claim 1, wherein D$_1$ is the diameter of the chamber of the reactor in the recycle zone and the height L$_6$ of the cylindrical upper part (42) is of between 0.01×D$_1$ and 2×D$_1$.

11. The reactor according to claim 1, wherein D$_1$ is the diameter of the chamber of the reactor in the recycle zone and the distance L$_7$ between the vertex of the cylindrical upper part (42) of the recycle cup (30) and the bottom of the upper end (48) of the chamber is of between 0.001×D$_1$ and 2×D$_1$.

12. A process for hydroconversion of a hydrocarbon feedstock comprising a reactor according to claim 1.

13. The process according to claim 12, wherein said hydrocarbon feedstock is a liquid hydrocarbon feedstock, and wherein:
    hydrogen and the liquid hydrocarbon feedstock are introduced into the lower end (49) of the chamber of the reactor according to an upward stream sufficient to produce a random movement of a catalyst in the form of particles in the catalytic reaction zone (22);
    the catalyst is maintained as an ebullating bed in the catalytic reaction zone (22) with an expansion in volume of between 10% and 100%, with respect to the static volume of said catalyst, by the injection of recycled liquid, resulting from the recycle zone adjacent to the upper end of the chamber via the recycle pipe (25), in order to carry out the hydroconversion reactions of said hydrocarbon feedstock;

a gas phase is separated from a liquid phase of a mixture originating from the catalytic reaction zone and sent into the pipes (27) of the recycle cup (30), a part of the liquid thus separated constituting the recycled liquid sent into the lower end of the chamber of the reactor; and the gas and the other part of the separated liquid present in the recycle zone (39) are discharged from the reactor, and in which the operating conditions of said reactor are as follows:

an absolute pressure of between 2 and 35 MPa, and a temperature of between 300° C. and 550° C.

14. The process according to claim 12, in which the feedstock is a liquid hydrocarbon feedstock comprising a fraction of at least 50% by weight having a boiling point of at least 300° C., and containing sulfur, Conradson carbon, metals and nitrogen.

15. The process according to claim 12, wherein said hydrocarbon feedstock is a solid hydrocarbon feedstock, and wherein:

hydrogen and a mixture of the solid hydrocarbon feedstock and of a liquid hydrocarbon feedstock are introduced into the lower end (49) of the chamber of the reactor according to an upward stream sufficient to produce a random movement of a catalyst in the form of particles in the catalytic reaction zone (22);

the catalyst is maintained as an ebullating bed in the catalytic reaction zone (22) with an expansion in volume of between 10% and 100%, with respect to the static volume of said catalyst, by the injection of recycled liquid, preferably by means of a pump, resulting from the recycle zone adjacent to the upper end of the chamber via the recycle pipe (25), in order to carry out the hydroconversion reactions of the solid hydrocarbon feedstock;

a gas phase is separated from a liquid phase of a mixture originating from the catalytic reaction zone and sent into the pipes (27) of the recycle cup (30), a part of the liquid thus separated constituting the recycled liquid sent into the lower end of the chamber of the reactor; and at least the gas and the other part of the separated liquid present in the recycle zone (39) are discharged from the reactor.

16. The reactor according to claim 3, in which the $L_2/L_1$ ratio is between 0.02 and 0.6.

17. The reactor according to claim 4, wherein the $L_{2b}/L_{1b}$ ratio is between 0.02 and 0.6.

18. The reactor according to claim 5, wherein each one of said frustoconical portions has an increasing angle of inclination $\beta$ ($\beta_1$, $\beta_2$, $\beta_3$) in the direction of the recycle pipe (25).

19. The reactor according to claim 6, wherein the $L_2/L_3$ ratio is between 0 0.02 and 0.6.

20. The reactor according to claim 7, wherein the $L_5/D_1$ ratio is between 0.02 and 10.

* * * * *